US008135989B2

(12) United States Patent
DeHaan et al.

(10) Patent No.: US 8,135,989 B2
(45) Date of Patent: Mar. 13, 2012

(54) SYSTEMS AND METHODS FOR INTERROGATING DIAGNOSTIC TARGET USING REMOTELY LOADED IMAGE

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 12/394,945

(22) Filed: Feb. 27, 2009

(65) Prior Publication Data
US 2010/0223504 A1 Sep. 2, 2010

(51) Int. Cl.
G06F 11/00 (2006.01)
(52) U.S. Cl. .......................................... 714/27; 714/25
(58) Field of Classification Search .................. 714/25, 714/27, 47
See application file for complete search history.

(56) References Cited

U.S. PATENT DOCUMENTS

| | | | |
|---|---|---|---|
| 4,866,707 A * | 9/1989 | Marshall et al. ............... | 714/749 |
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,158,011 A * | 12/2000 | Chen et al. ...................... | 726/15 |
| 6,212,585 B1 | 4/2001 | Chrabaszcz | |
| 6,243,747 B1 | 6/2001 | Lewis et al. | |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 * | 8/2002 | Woodruff .......................... | 714/27 |
| 6,516,427 B1 * | 2/2003 | Keyes et al. .................... | 714/25 |
| 6,526,442 B1 | 2/2003 | Stupek et al. | |
| 6,550,021 B1 * | 4/2003 | Dalphy et al. ................... | 714/11 |
| 6,557,169 B1 * | 4/2003 | Erpeldinger .................. | 717/173 |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,751,659 B1 | 6/2004 | Fenger et al. | |
| 6,757,837 B1 * | 6/2004 | Platt et al. ......................... | 714/4 |
| 6,769,022 B1 | 7/2004 | DeKoning et al. | |
| 6,779,004 B1 | 8/2004 | Zintel | |
| 6,845,464 B2 * | 1/2005 | Gold ................................. | 714/6 |

(Continued)

OTHER PUBLICATIONS

DeHaan, "Systems and Methods for Cloning Target Machines in a Software Provisioning Environment", U.S. Appl. No. 12/473,014, filed May 27, 2009.

(Continued)

Primary Examiner — Marc Duncan
(74) Attorney, Agent, or Firm — Lowenstein Sandler PC (57) ABSTRACT

Embodiments relate to systems and methods for interrogating one or more diagnostic targets using a remotely loaded image. A set of managed machines, such as personal computers or servers, can be managed by a network management engine communicating with the machines via a secure channel. The network management engine can access a selected diagnostic target to temporarily deactivate the installed native operating system on that target, insert a substitute operating environment, and remotely interrogate the target to perform hardware, software, security, or other diagnostics or installs. The network management engine can connect to the diagnostic target, extract security keys from the native operating environment, remotely load the substitute environment, and then perform diagnostic or provisioning activities while the native environment is deactivate and the diagnostic target is effectively off-network. Installations, diagnostics, or other activities that require the diagnostic target to be isolated from other machines can therefore be safely conducted.

14 Claims, 4 Drawing Sheets

U.S. PATENT DOCUMENTS

| | | |
|---|---|---|
| 6,865,737 B1 | 3/2005 | Lucas et al. |
| 6,947,939 B2 | 9/2005 | Fujibayashi et al. |
| 6,986,033 B2 | 1/2006 | Miyamoto et al. |
| 7,013,461 B2 * | 3/2006 | Hellerstein et al. ............ 717/177 |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,340,637 B2 | 3/2008 | Nagoya |
| 7,350,112 B2 * | 3/2008 | Fox et al. ......................... 714/38 |
| 7,356,679 B1 | 4/2008 | Le et al. |
| 7,395,322 B2 | 7/2008 | Harvey et al. |
| 7,506,040 B1 | 3/2009 | Rabe et al. |
| 7,506,151 B2 * | 3/2009 | Miyamoto et al. ................. 713/2 |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 * | 3/2010 | Abali et al. ....................... 714/27 |
| 7,716,316 B2 * | 5/2010 | Nichols et al. ................. 709/223 |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,937,437 B2 | 5/2011 | Fujii |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1 | 4/2003 | Nair et al. |
| 2003/0070110 A1 * | 4/2003 | Aija et al. .......................... 714/4 |
| 2003/0074549 A1 | 4/2003 | Paul et al. |
| 2003/0110173 A1 | 6/2003 | Marsland |
| 2003/0119480 A1 | 6/2003 | Mohammad |
| 2003/0126585 A1 | 7/2003 | Parry |
| 2003/0195921 A1 | 10/2003 | Becker et al. |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1 | 7/2004 | Rockwell |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0050175 A1 | 3/2005 | Fong et al. |
| 2005/0114474 A1 | 5/2005 | Anderson et al. |
| 2005/0125525 A1 | 6/2005 | Zhou et al. |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1 | 9/2006 | Penkethman |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1 | 7/2007 | Luiro et al. |
| 2007/0169093 A1 | 7/2007 | Logan et al. |
| 2007/0192158 A1 * | 8/2007 | Kim .................................. 705/9 |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1 | 12/2007 | Ayachitula et al. |
| 2007/0299951 A1 | 12/2007 | Krithivas |
| 2008/0028048 A1 | 1/2008 | Shekar et al. |
| 2008/0040452 A1 | 2/2008 | Rao et al. |
| 2008/0046708 A1 | 2/2008 | Fitzgerald et al. |
| 2008/0059959 A1 | 3/2008 | Chen et al. |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1 | 9/2008 | Huang et al. |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0288938 A1 | 11/2008 | DeHaan |
| 2008/0288939 A1 | 11/2008 | DeHaan |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1 | 1/2009 | Appiah et al. |
| 2009/0055901 A1 | 2/2009 | Kumar et al. |
| 2009/0064132 A1 | 3/2009 | Suchy et al. |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132681 A1 | 5/2009 | Counterman |
| 2009/0132710 A1 | 5/2009 | Pelley |
| 2009/0158148 A1 | 6/2009 | Vellanki et al. |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0259665 A1 | 10/2009 | Howe et al. |
| 2009/0265707 A1 | 10/2009 | Goodman et al. |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0049838 A1 | 2/2010 | DeHaan |
| 2010/0050169 A1 | 2/2010 | DeHaan |
| 2010/0054156 A1 | 3/2010 | DeHaan |
| 2010/0057833 A1 | 3/2010 | DeHaan |
| 2010/0057890 A1 | 3/2010 | DeHaan |
| 2010/0057913 A1 | 3/2010 | DeHaan |
| 2010/0057930 A1 | 3/2010 | DeHaan |
| 2010/0058307 A1 | 3/2010 | DeHaan |
| 2010/0058327 A1 | 3/2010 | DeHaan |
| 2010/0058328 A1 | 3/2010 | DeHaan |
| 2010/0058330 A1 | 3/2010 | DeHaan |
| 2010/0058332 A1 | 3/2010 | DeHaan |
| 2010/0058444 A1 | 3/2010 | DeHaan |
| 2010/0082799 A1 | 4/2010 | DeHaan et al. |
| 2010/0083245 A1 | 4/2010 | DeHaan et al. |
| 2010/0100876 A1 | 4/2010 | Glover et al. |
| 2010/0128639 A1 | 5/2010 | DeHaan et al. |
| 2010/0131648 A1 | 5/2010 | DeHaan |
| 2010/0138521 A1 | 6/2010 | DeHaan et al. |
| 2010/0138526 A1 | 6/2010 | DeHaan et al. |
| 2010/0138696 A1 | 6/2010 | DeHaan et al. |
| 2010/0217837 A1 | 8/2010 | Ansari et al. |
| 2010/0217840 A1 | 8/2010 | DeHaan et al. |
| 2010/0217843 A1 | 8/2010 | DeHaan et al. |
| 2010/0217848 A1 | 8/2010 | DeHaan et al. |
| 2010/0217944 A1 | 8/2010 | DeHaan et al. |
| 2010/0218243 A1 | 8/2010 | DeHaan et al. |

| | | |
|---|---|---|
| 2010/0220584 A1 | 9/2010 | DeHaan et al. |
| 2010/0223367 A1 | 9/2010 | DeHaan |
| 2010/0223607 A1 | 9/2010 | DeHaan |
| 2010/0223608 A1 | 9/2010 | DeHaan et al. |
| 2010/0223609 A1 | 9/2010 | DeHaan et al. |
| 2010/0223610 A1 | 9/2010 | DeHaan et al. |

OTHER PUBLICATIONS

DeHaan, "Systems and Methods for Providing Configuration Management Services from a Provisioning Server", U.S. Appl. No. 12/414,941, filed Mar. 31, 2009.

DeHaan, "Systems and Methods for Retiring Target Machines by a Provisioning Server", U.S. Appl. No. 12/475,427, filed May 29, 2009.

DeHaan, "Systems and Methods for Message-Based Installation Management Using Message Bus", U.S. Appl. No. 12/495,077, filed Jun. 30, 2009.

Henson, "Systems and Methods for Integrating Storage Resources from Storage Area Network in Machine Provisioning Platform", U.S. Appl. No. 12/628,041, filed Nov. 30, 2009.

Henson, "Systems and Methods for Mounting Specified Storage Resources from Storage Area Network in Machine Provisioning Platform", U.S. Appl. No. 12/627,988, filed Nov. 30, 2009.

Doc Seeds "Linux for Suits", 2005, Specialized System Consultants Inc., vol. 2005.

eBook "Microsoft System Management Server 2003 Administrator's companion", Microsoft Press, c2004, Ch. 13, Patch Management, pp. 471-507.

Butt et al., "Automated Installation of Large-Scale Linux Networks", 2000.

Agarwalla, "Automating Provisioning of Complete Software Stack in a Grid Environment", 2004.

Anderson et al., "Technologies for Large-Scale Configuration Management", Dec. 9, 2002.

Grosse, "Repository Mirroring", 1995.

HP Storage Essentials SRM 6.0 Installation Guide. Jan. 2008. HP. 1st ed. Part No. T4283-96113. pp. 1-5, 97-136, 219-228.

HP Storage Essentials SRM 6.0 User Guide. Jan. 2008. HP. 1st ed. Part No. T4238-96114, pp. 1-83.

Michael DeHaan. "Unfiled Provisioning". 2007.

Michael DeHaan. "Provisioning with Cobbler", 2007.

Tan et al. "A WBEM Basked Disk Array Management Provider". 2005. IEEE. 2005 International Conference on Cyberworlds.

Lovelace et al. Managing Disk Subsystems using IBM TotalStorage Productivity Center. Sep. 3006. IBM. 2nd ed. SG24-7097-01. pp. 1-42.

* cited by examiner

SYSTEMS AND METHODS FOR INTERROGATING DIAGNOSTIC TARGET USING REMOTELY LOADED IMAGE

FIELD

The present teachings relate to systems and methods for interrogating a remote diagnostic target using a remotely loaded image, and more particularly to platforms and techniques for securely inserting an image of an operating system or other operating environment on a diagnostic target to perform diagnostic or provisioning activity on that target, without interference from the target's native operating environment, associated network, or other machines.

BACKGROUND OF RELATED ART

Network management platforms exist which permit a systems administrator to connect to a set of targets in a network, and perform maintenance and diagnostic activities on that group of managed machines. The network management platform can identify individual targets via a public key or other security credential, and identify the software provisioning requirements, obtain a hardware inventory, or perform other management tasks on validated machines. In general, existing network management platforms can be hosted on a central server or other facility that permits connection to, identification, and management of the set of targets.

Existing network management platforms can be affected, however, by limitations in their network arrangement and control structure. For instance, in cases where a network management platform wishes to attempt to inspect or inventory a target machine, and/or perform diagnostics, debugging, and/or benchmarking on that machine, the native operating system or other native environment hosted on that machine can interfere with or affect the results. By the same token, the network in which the target machine is installed can have an undesired effect on a machine which is under diagnostic control, so that it may return different results than if the machine were operating in isolation, off-network. Similarly, security issues may arise if the network management platform wishes to attempt to perform low-level or sensitive tasks, such as configuring hard drive or other storage on the target machine, while that machine is exposed to the network. Thus, there is a need in the art for methods and systems that provide an ability to connect to and maintain a target machine in a network while avoiding security and operational issues, yet without having to physically disconnect the machine from its network to ensure isolation.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for interrogating a diagnostic target using a remotely loaded image can be practiced, by which secure operations can be performed one or more diagnostic targets on a secure selective basis. More particularly, embodiments relate to platforms and techniques for establishing a secure connection between a network management platform and one or more diagnostic targets in a group of managed machines. In terms of operational environment, in general the network management platform can communicate with the set of managed machines, such as personal computers, servers, virtual machines, and/or other devices, and manage the security of those machines under the supervision of that platform. The network management platform can establish a set of security policies for managed machines in its domain.

The one or more diagnostic targets to which diagnostic activities are to be directed can each comprise a native operating environment, such as an installed operating system and/or related resources. The network management platform can establish a secure channel to one or more diagnostic target in the set of managed machines. The network management platform can retrieve security keys, certificates, or other credentials from the diagnostic target(s) with which it has established communication. The network management platform can prepare a live image of a substitute operating environment, such as an operating system, to transmit to the intended diagnostic target(s). The network management platform can communicate the live image and remotely load that substitute operating environment on the one or more target(s), and boot that one or more target into the substitute operating environment. The network management platform can load the security credentials into the diagnostic target(s), and then perform maintenance, diagnostic, provisioning, and/or other operations on that target while under control of the substitute operating environment. While under the control of the substitute operation environment and communicating with the network management platform via the secure channel, the diagnostic target(s) can be effectively isolated from the network and operated on without interference from the network, peer machines, or other possible intrusions or interruptions. Software provisioning, storage allocation or other hardware configuration, and/or other tasks can then be performed on the diagnostic target(s), to update that machine or machines, obtain inventory or other reports, and complete other management tasks. After performance of those tasks, the diagnostic target(s) can be re-booted back to their native operating environment and returned to regular network operation. Provisioning, diagnostic, and other actions can therefore be performed, while maintaining the integrity of the diagnostic target(s) and/or their associated networks, on a secure basis.

Reference will now be made in detail to exemplary embodiments of the present teachings, which are illustrated in the accompanying drawings. Where possible the same reference numbers will be used throughout the drawings to refer to the same or like parts.

Figure 1:
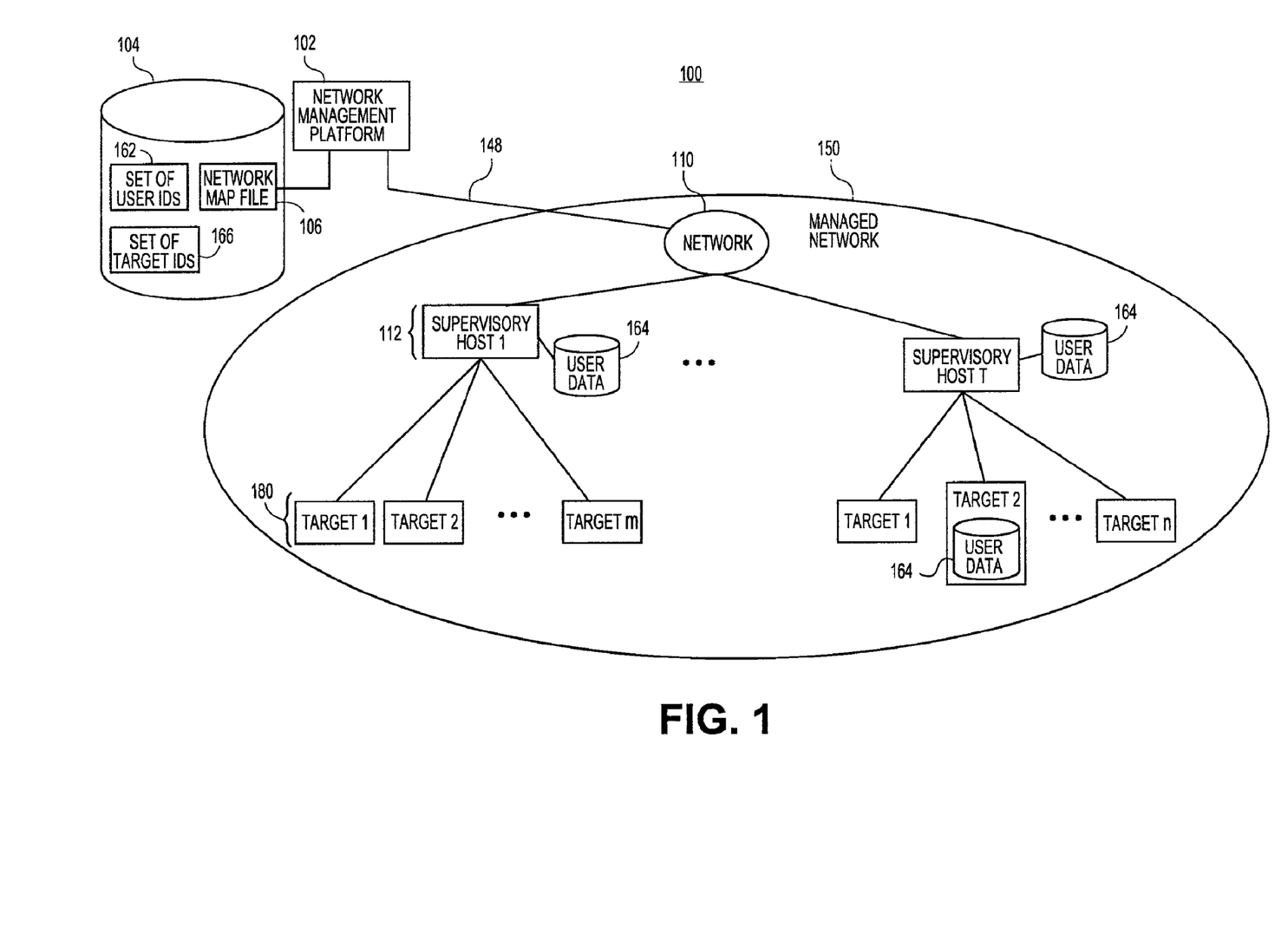
FIG. 1 illustrates an overall network in which systems and methods for interrogating a diagnostic target using a remotely loaded image can be practiced, according to various embodiments of the present teachings.

FIG. 1 illustrates an overall system 100 in which systems and methods for interrogating one or more diagnostic target using a remotely loaded image can be implemented, according to various embodiments of the present teachings. In embodiments as shown, network management platform 102 can communicate with managed network 150 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. patent application Publication Ser. No. 2009/0300180, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. Managed network 150 can include, as shown, a set of supervisory hosts 112, a set of targets 180, and/or other machines, devices, clients, and/or other hardware, software, storage or other resources.

According to embodiments as shown, one or more diagnostic target 160 can be selected in managed network 150 upon which to perform maintenance, diagnostic, provisioning, or other management or control activities. While secure channel 148 is illustratively shown as one channel to managed network 150 or devices therein, it will be understood that in embodiments, secure channel 148 can comprise multiple channels or connections. In general, network management platform 102 can communicate with the managed network 150 and its constituent machines and resources, which can for instance comprise personal computers, servers, network-enable devices, virtual machines, and/or other devices, and manage the security of those machines under the supervision of network management platform 102. The network management platform 102 can establish a set of security policies for managed machines in its domain, including for example an access control list (ACL) and/or other policies, lists, or parameters for the maintenance and management of managed network 150. Security policies and other data can for instance be stored in network store 104.

According to embodiments in one regard, network management platform 102 can operate to connect to a given one or more of managed network 150 to securely identify that machine or machine, and perform diagnostic, provisioning, maintenance, and/or other operations on that machine or machines. According to embodiments, network management platform 102 can identify the desired diagnostic target or targets using its own criteria or logic, such as, for instance, maintenance schedules stored in network management platform 102. According to embodiments, network management platform 102 can receive instructions to act on one or more diagnostic target, for instance, via manual input from a systems administrator, or other manual or automatic commands. Once one or more diagnostic targets have been identified, network management platform 102 can act to deactivate the native operating environment of that machine or machines, activate a substitute or temporary operating environment on that machine or machines, perform diagnostic, provisioning, maintenance, or other operations on that machine or machines, and then return that machine or machines for regular operation in managed network 150.

Figure 2:
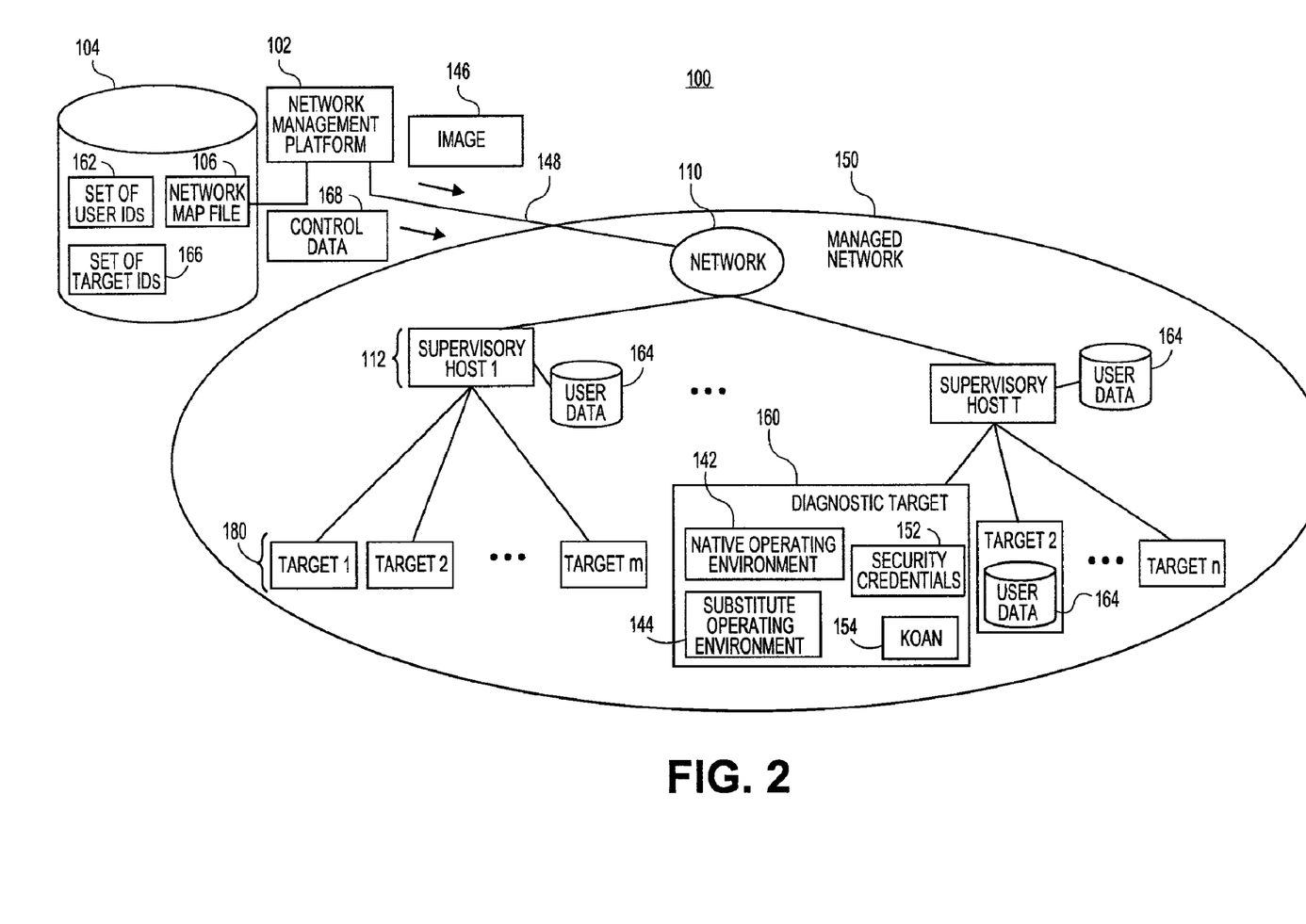
FIG. 2 illustrates an overall network in which systems and methods for interrogating a diagnostic target using a remotely loaded image can be practiced according to various embodiments of the present teachings, including remote image loading of a substitute operating environment.

More particularly, and as for example illustrated in FIG. 2, network management platform 102 can establish a secure connection 148 to one or more diagnostic target 160 in managed network 150. Each one of one or more diagnostic target 160 can have an associated native operating environment 142, such as an operating system, installed on that machine. Native operating environment 142 can be or include, for instance, a distribution of the Linux™ operating system, the Unix™ operating system, or other open-source or proprietary operating system or platform. native operating environment 142 can operate under control of native operating environment 142 during regular operation in managed network 150, or other times. Each of one or more diagnostic target 160 can include a koan (kickstart on network) module 154, as described in copending U.S. patent application Ser. No. 11/763,315, U.S. patent application Publication Ser. No. 2008/0288938 and U.S. patent application Ser. No. 11/763,333, U.S. patent Publication Ser. No. 2008/0288939, the disclosures of which are incorporated herein, in their entirety, by reference. Other logic or tools can be used to communicate with network management platform 102.

Network management platform 102 can establish secure connection 148 to one or more diagnostic target 160, and interact with one or more diagnostic target 160 to identify and validate that machine's installation, connection, and operation, and prepare to perform diagnostic or other operations on that machine. Network management platform 102 can, for example, confirm a physical address or identifier of one or more diagnostic target 160, such as a media access control (MAC) address for that machine. Network management platform 102 can also access and/or extract a set of security credentials 152 stored on or associated with one or more diagnostic target 160. Set of security credentials 152 can be or include, for instance, a security key, public/private key infrastructure data, digital certificates or signatures, and/or other security objects, mechanisms, or data.

After identifying one or more diagnostic target 160 and extracting set of security credentials 152, network management platform 102 can transmit an image 146 of a substitute operating environment 144 to one or more diagnostic target 160. Image 146 can be or include an image or installation file for an operating system, such as the Linux™ or other operating system or platform. Image 146 can be received in one or more diagnostic target 160 and installed or loaded into that one or more respective machine to generate or invoke substitute operating environment 144. After loading or installation, network management platform 102 can direct that the one or more diagnostic target 160 boot down and/or otherwise deactivate native operating environment 142. network management platform 102 can then direct that image 146 be loaded or installed in one or more diagnostic target 160, for instance, by invoking a "kexec" or other command or routine, and that one or more diagnostic target 160 boot into substitute operating environment 144, and operate under control of that environment as directed by network management platform 102.

Once one or more diagnostic target 160 has been booted into substitute operating environment 144, network management platform 102 can direct various maintenance, diagnostic, provisioning, security, and/or other operations on one or more diagnostic target 160. According to various embodiments, inventory reports, software provisioning data, security data, and/or other control or management actions can be communicated to one or more diagnostic target 160 in or via command data 154 that can be exchanged between network management platform 102 and one or more diagnostic target 160. According to embodiments, because one or more diagnostic target 160 acts under the temporary control of substitute operating environment 144 in conjunction with network management platform 102, one or more diagnostic target 160 is effectively off-line, logically disconnected, or isolated from managed network 150 during the duration of that operating environment.

Network management platform 102 can therefore interact with one or more diagnostic target 160 to configure resources, such as storage resources, basic input/output system (BIOS) resources, user profiles, software installation lists, and/or other resources with enhanced security and reliability. Upon completion of the diagnostic or other management activity, network management platform 102 can direct that one or more diagnostic target 160 boot down to pass out of the control of substitute operating environment 144, and then re-boot or re-activate to resume operation and control under native operating environment 142. In embodiments, network management platform 102 can direct that one or more diagnostic target 160 enter and re-enter the control of substitute operating environment 144 multiple times, and/or at specified scheduled times.

Figure 3:
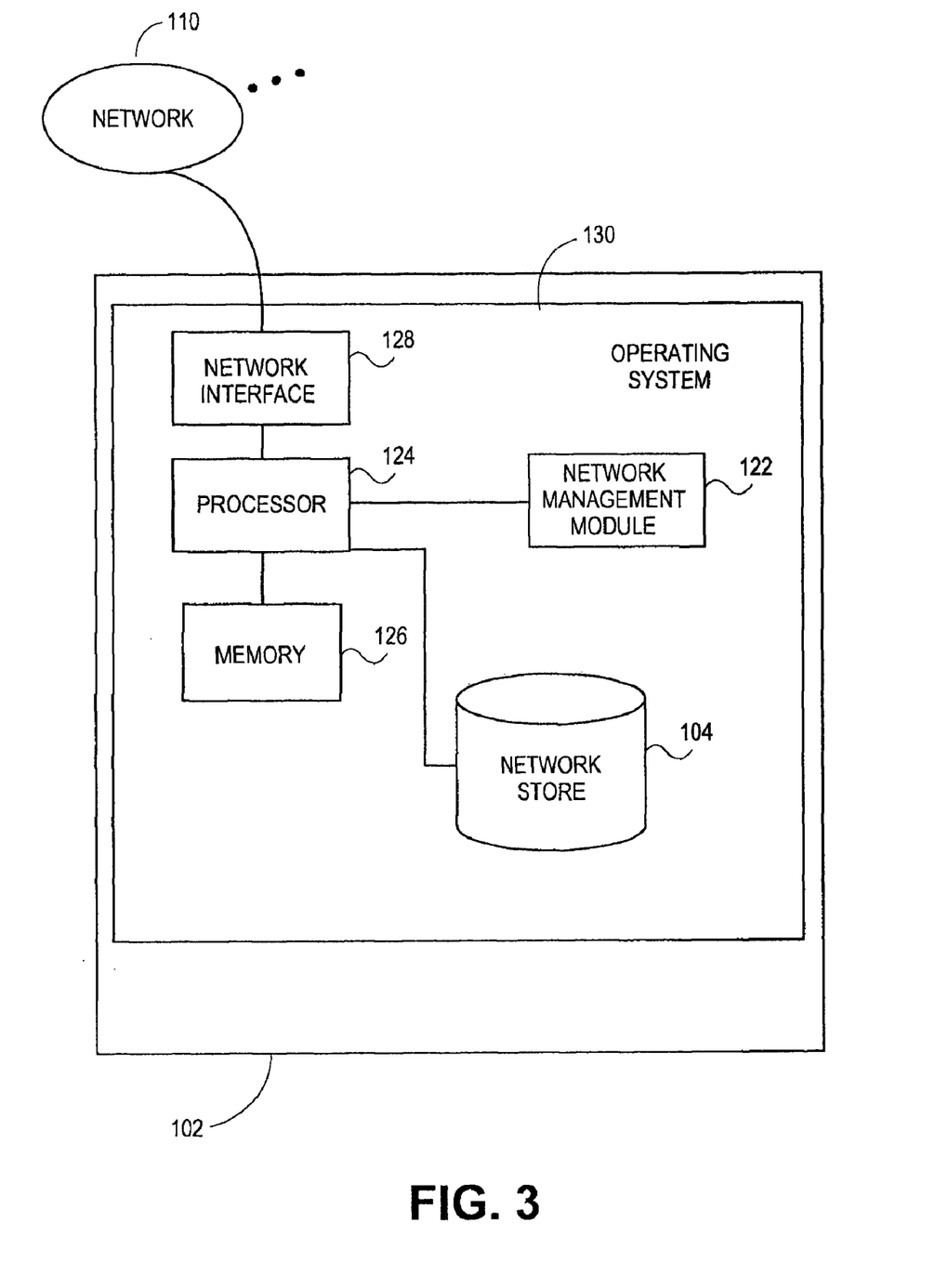
FIG. 3 illustrates an illustrative hardware configuration which can support systems and methods for interrogating a diagnostic target using a remotely loaded image can be practiced, according to various embodiments of the present teachings.

FIG. 3 illustrates an exemplary diagram of hardware and other resources that can be incorporated in a network management platform 102 configured to communicate with managed network 150 and/or other resources including one or more diagnostic target 160, and/or other hardware or software resources, according to embodiments. In embodiments as shown, the network management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with network management module 122, to execute control logic and perform secure diagnostic and management processes described herein. Other configurations of the network management platform 102, associated network connections, and other hardware and software resources are possible. While FIG. 3 illustrates network management platform 102 as a standalone system comprises a combination of hardware and software, network management platform 102 can also be implemented as a software application or program capable of being executed by a conventional computer platform. Likewise, network management platform 102 can also be implemented as a software module or program module capable of being incorporated in other software applications and programs. In either case, network management platform 102 can be implemented in any type of conventional proprietary or open-source computer language.

Figure 4:
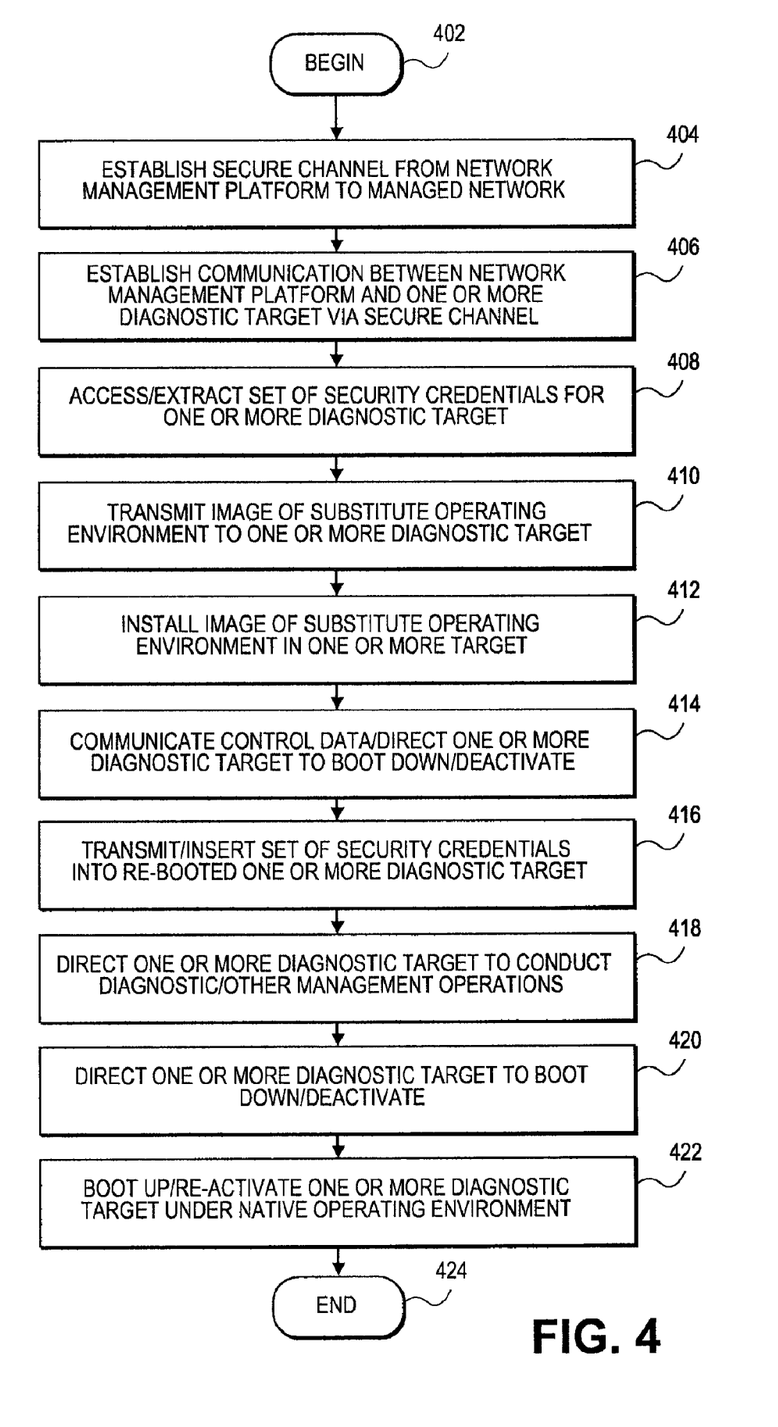
FIG. 4 illustrates an overall flowchart for interrogating a diagnostic target using a remotely loaded image can be practiced, according to various embodiments of the present teachings.

FIG. 4 illustrates a flowchart of processing to interrogate one or more diagnostic target using a remotely loaded image, according to various embodiments. In 402, processing can begin. In 404, network management platform 102 can establish a secure channel 148 to a managed network 150, such as a set of personal computers, workstations, laptops, servers, and/or other machines on a local area network (LAN) or other network. In 406, the network management platform 102 can communicate with one or more diagnostic target 160 via secure channel 148 to begin diagnostic and/or other management operations. In 408, network management platform 102 can access and/or extract a set of security credentials 152 for each machine in one or more diagnostic target 160. In embodiments, set of security credentials 152 can comprise security keys, public/private key information, digital certificates or signatures, physical identifiers, and/or other information.

In 410, network management platform 102 can transmit an image 146 of a substitute operating environment 144 to each machine in one or more diagnostic target 160 via secure channel 148. In 412, each machine in one or more diagnostic target 160 can load or install image 146, for example, using a koan module 152 or other locally installed tool or logic. In 414, network management platform 102 can direct each machine in one or more diagnostic target 160 via control data 154 and/or other commands to boot down, turn off, disconnect, or otherwise deactivate native operating environment 142. In 416, each machine in one or more diagnostic target 160 can boot/re-boot, re-initialize, power on, or otherwise re-initialize or re-activate into substitute operating environment 144. In 416, network management platform 102 can transmit or insert set of security credentials 152 into each machine in one or more diagnostic target 160 temporarily operating under substitute operating environment 144.

In 418, network management platform 102 can direct diagnostic, provisioning, maintenance, security, and/or other operations be performed on each machine in one or more diagnostic target 160. For example, a storage configuration or basic input/output system (BIOS) configuration can be installed or updated. For further example, an inventory of hardware or software resources can be performed, and/or various reports can be run indicating the state of each machine in one or more diagnostic target 160. In 420, network management platform 102 can direct that each machine in one or more diagnostic target 160 boot down or otherwise de-activate substitute operating environment. In 422, network management platform 102 can direct that each machine in one or more diagnostic target 160 restore native operating environment 142 and resume regular operation in managed network 150. In 424, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single network management platform 140 manages the security of managed network 150, in embodiments, multiple security engines, servers, or other entities can cooperate to perform security functions. For further example, while embodiments have been described in which diagnostic, maintenance, and/or other operations can be performed on a single diagnostic target 160, in embodiments, multiple diagnostic targets or an entire group of managed machines can be operated on at one time or together. For further example, while embodiments have been described in which a single image 146 is communicated to one or more diagnostic target 160, in embodiments, an image can contain multiple constituent files or modules, or multiple images can be transmitted to the target(s). Other resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method of performing remote operations on a machine, the method executed by a processor, the method comprising:

accessing, using the processor, a diagnostic target having a native operating environment comprising an operating system using a secure channel in a network;

transmitting an image of a substitute operating environment comprising a substitute operating system to the diagnostic target using the secure channel;

remotely installing the image of the substitute operating environment on the diagnostic target using the secure channel, wherein the substitute operating environment is separate from the native operating environment;

deactivating the native operating environment;

activating the substitute operating environment;

interrogating the diagnostic target using the substitute operating environment; and re-booting the diagnostic target back to the native operating environment after interrogating the diagnostic target.

2. The method of claim 1, wherein the installing comprises importing security credentials from the native operating environment to the substitute operating environment.

3. The method of claim 1, wherein the diagnostic target comprises at least one of a personal computer, a laptop computer, a workstation, and a server, installed on the network.

4. The method of claim 1, wherein the activating the substitute operating environment comprises booting the diagnostic target into the substitute operating environment while the native operating environment is deactivated.

5. The method of claim 1, wherein the interrogating comprises at least one of debugging the diagnostic target, monitoring the diagnostic target, performing data collection on the diagnostic target, generating reports from the diagnostic target, inventorying the diagnostic target, configuring storage resources on the diagnostic target, configuring a basic input/output system (BIOS) of the diagnostic target, and provisioning the diagnostic target with software.

6. A network management platform, comprising:

an interface to a diagnostic target having a native operating environment comprising an operating system in a network; and a network management engine, communicating with the diagnostic target using the interface, the network management engine being configured to:

access the diagnostic target using a secure channel in a network, transmit an image of a substitute operating environment comprising a substitute operating system to the diagnostic target using the secure channel;

remotely install the image of the substitute operating environment on the diagnostic target using the secure channel, wherein the substitute operating environment is separate from the native operating environment, deactivate the native operating environment, activate the substitute operating environment, interrogate the diagnostic target using the substitute operating environment; and re-boot the diagnostic target back to the native operating environment after interrogating the diagnostic target.

7. The network management platform of claim 6, wherein the network management engine is further configured to import security credentials from the native operating environment to the substitute operating environment.

8. The network management platform of claim 6, wherein the diagnostic target comprises at least one of a personal computer, a laptop computer, a workstation, and a server, installed on the network.

9. The network management platform of claim 6, wherein the network management engine is further configured to activate the substitute operating environment by booting the diagnostic target into the substitute operating environment while the native operating environment is deactivated.

10. The network management platform of claim 6, wherein the interrogation comprises at least one of debugging the diagnostic target, monitoring the diagnostic target, performing data collection on the diagnostic target, generating reports from the diagnostic target, inventorying the diagnostic target, configuring storage resources on the diagnostic target, configuring a basic input/output system (BIOS) of the diagnostic target, and provisioning the diagnostic target with software.

11. A non-transitory computer readable medium encoded to interrogate a target machine comprising:

accessing a diagnostic target, the diagnostic target having a native operating environment comprising an operating system, using a secure channel in a network;

transmitting an image of a substitute operating environment comprising a substitute operating system to the diagnostic target using the secure channel;

remotely installing the image of the substitute operating environment on the diagnostic target using the secure channel, wherein the substitute operating environment is separate from the native operating environment;

deactivating the native operating environment;

activating the substitute operating environment;

interrogating the diagnostic target using the substitute operating environment; and re-booting the diagnostic target back to the native operating environment after interrogating the diagnostic target.

12. The non-transitory computer readable medium of claim 11, wherein the installing comprises importing security credentials from the native operating environment to the substitute operating environment.

13. The non-transitory computer readable medium of claim 11, wherein the diagnostic target comprises at least one of a personal computer, a laptop computer, a workstation, and a server, installed on the network.

14. The non-transitory computer readable medium of claim 11, wherein the activating the substitute operating environment comprises booting the diagnostic target into the substitute operating environment while the native operating environment is deactivated.

* * * * *